United States Patent
Sumin et al.

(10) Patent No.: US 12,175,211 B2
(45) Date of Patent: Dec. 24, 2024

(54) SYSTEM AND METHOD FOR CREATING CONFIGURATIONAL BLOCKS USED FOR BUILDING CONTINUOUS REAL-TIME SOFTWARE LOGICAL SEQUENCES

(71) Applicant: BANK OF AMERICA CORPORATION, Charlotte, NC (US)

(72) Inventors: Anton Sumin, Brooklyn, NY (US); Piedad Burnside, Hicksville, NY (US); Sanjay Pillay, Round Rock, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 323 days.

(21) Appl. No.: 17/549,321

(22) Filed: Dec. 13, 2021

(65) Prior Publication Data

US 2023/0185543 A1     Jun. 15, 2023

(51) Int. Cl.
| | |
|---|---|
| *G06F 9/44* | (2018.01) |
| *G06F 8/34* | (2018.01) |
| *G06F 8/35* | (2018.01) |
| *G06F 9/451* | (2018.01) |

(52) U.S. Cl.
CPC ............ *G06F 8/34* (2013.01); *G06F 8/35* (2013.01); *G06F 9/451* (2018.02)

(58) Field of Classification Search
CPC ....................................................... G06F 8/34
USPC ............................................................ 717/107
See application file for complete search history.

(56) References Cited

U.S. PATENT DOCUMENTS

| | | | |
|---|---|---|---|
| 6,061,515 A | 5/2000 | Chang et al. | |
| 6,349,404 B1 | 2/2002 | Moore et al. | |
| 7,131,112 B1 | 10/2006 | Bartz et al. | |
| 9,075,601 B1 * | 7/2015 | Hucik | G06F 16/00 |
| 9,158,658 B2 | 10/2015 | Bigwood et al. | |
| 9,547,482 B2 | 1/2017 | Soffer et al. | |
| 10,223,658 B2 | 3/2019 | Cornilescu | |
| 11,070,454 B1 | 7/2021 | Najumudeen et al. | |
| 11,669,436 B2 | 6/2023 | Ingram | |
| 11,797,316 B2 | 10/2023 | Dantuluri | |
| 2002/0199031 A1 | 12/2002 | Rust et al. | |

(Continued)

FOREIGN PATENT DOCUMENTS

| | | | | |
|---|---|---|---|---|
| JP | 2017076385 A | * | 4/2017 | ........... G05B 19/418 |

OTHER PUBLICATIONS

Translated version of JP-2017076385, 2017.*

*Primary Examiner* — Hang Pan
(74) *Attorney, Agent, or Firm* — Moore & Van Allen PLLC; Anoohya Yarlagadda (57) ABSTRACT

Embodiments of the present invention provide a system for creating configurational blocks used for building continuous real-time software logical sequences. The system is configured for creating a set of configurational blocks associated with building one or more real-time software logical sequences, displaying the set of configurational blocks, via a graphical user interface to a user, allowing the user to select one or more configurational blocks from the set of configuration blocks, receiving the one or more configurational blocks and one or more links associated with connection of the one or more configurational blocks from the user, via the graphical user interface, and generating a continuous real-time software logical sequence based on the one or more configurational blocks and the one or more links received from the user.

18 Claims, 6 Drawing Sheets

(56) References Cited

U.S. PATENT DOCUMENTS

| | | | |
|---|---|---|---|
| 2006/0168557 A1 | 7/2006 | Agrawal et al. | |
| 2007/0288891 A1 | 12/2007 | Aakolk et al. | |
| 2014/0033173 A1* | 1/2014 | Frenkiel | G06F 8/74 |
| | | | 717/123 |
| 2015/0052331 A1* | 2/2015 | Dhurjati | G06F 9/3877 |
| | | | 712/30 |
| 2015/0067647 A1 | 3/2015 | Bakowski et al. | |
| 2020/0097266 A1* | 3/2020 | Lodhia | G06F 8/36 |
| 2021/0165647 A1 | 6/2021 | Krishnamoorthy | |
| 2023/0051241 A1 | 2/2023 | Jagadeeswaran et al. | |

\* cited by examiner

SYSTEM AND METHOD FOR CREATING CONFIGURATIONAL BLOCKS USED FOR BUILDING CONTINUOUS REAL-TIME SOFTWARE LOGICAL SEQUENCES

BACKGROUND

Conventional systems do not have the capability to allows users to build continuous software logical sequences in real-time. As such, there exists a need for a system that creates configurational blocks and allows users to use the configurational blocks to build continuous software logical sequences in real-time.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for creating configurational blocks used for building continuous real-time software logical sequences. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention creates a set of configurational blocks associated with building one or more real-time software logical sequences, displays the set of configurational blocks, via a graphical user interface to a user, allows the user to select one or more configurational blocks from the set of configuration blocks, receives the one or more configurational blocks and one or more links associated with connection of the one or more configurational blocks from the user, via the graphical user interface, and generates a continuous real-time software logical sequence based on the one or more configurational blocks and the one or more links received from the user.

In some embodiments, the present invention executes the continuous real-time software logical sequence in response to generating the continuous real-time software logical sequence.

In some embodiments, the one or more configurational blocks comprise one or more property meta-tags.

In some embodiments, the present invention in response to executing the continuous real-time software logical sequence, creates one or more runtime variables associated with the continuous real-time software logical sequence and assigns the one or more runtime variables to the one or more property meta-tags.

In some embodiments, the present invention creates the set of configurational blocks based on one or more inputs from one or more users.

In some embodiments, the one or more configurational blocks are nested configurational blocks.

In some embodiments, the continuous real-time software logical sequence is a Representational State Transfer Application Programming Interface call.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As described herein, the term "entity" may be any organization that develops one or more applications for performing one or more organizational activities associated with the entity or a third party entity. In some embodiments, the entity may be a financial institution which may include herein may include any financial institutions such as commercial banks, thrifts, federal and state savings banks, savings and loan associations, credit unions, investment companies, insurance companies and the like. In some embodiments, the entity may be a non-financial institution.

Many of the example embodiments and implementations described herein contemplate interactions engaged in by a user with a computing device and/or one or more communication devices and/or secondary communication devices. A "user", as referenced herein, may refer to an entity or individual that has the ability and/or authorization to access, develop, manage, maintain, test, and/or use one or more applications provided by the entity and/or the system of the present invention. In some embodiments, the user may be an employee of the entity. Furthermore, as used herein, the term "user computing device" or "mobile device" may refer to mobile phones, computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user or to output data to a user. These input and output devices may include a display, mouse, keyboard, button, touchpad, touch screen, microphone, speaker, LED, light, joystick, switch, buzzer, bell, and/or other user input/output device for communicating with one or more users.

Figure 1:
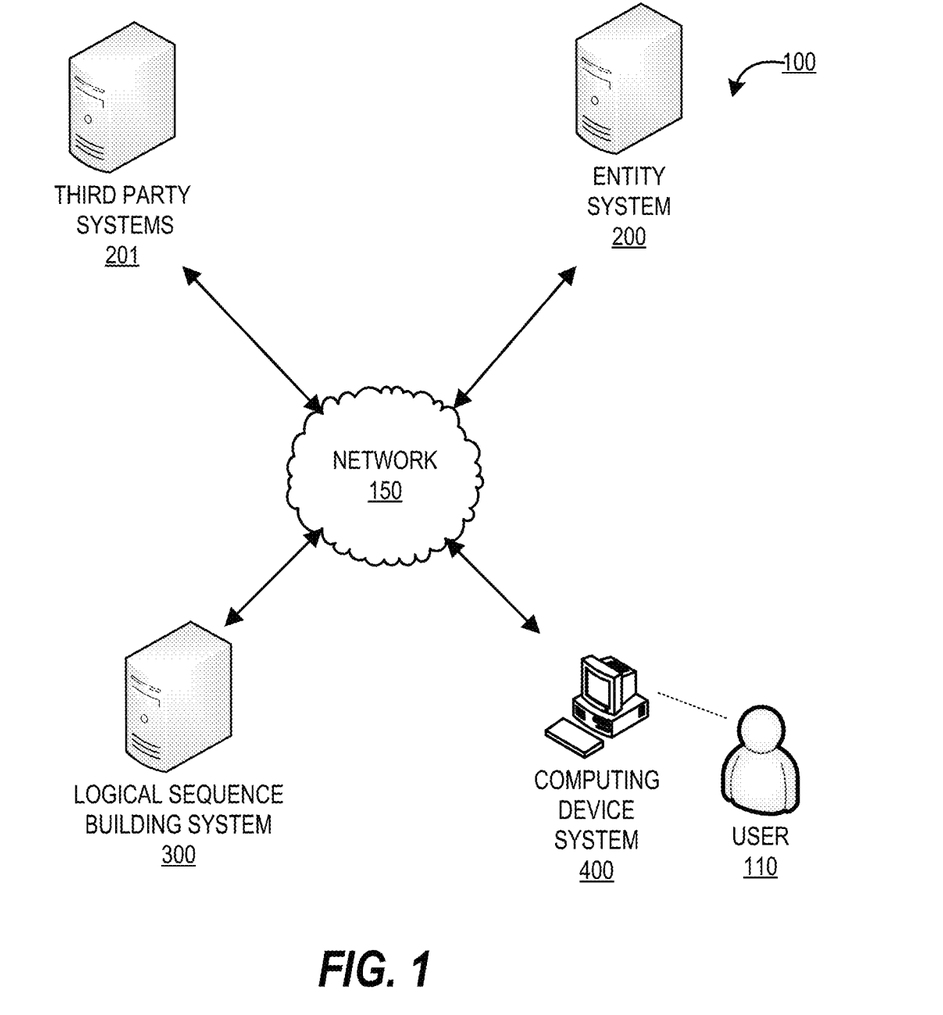
FIG. 1 provides a block diagram illustrating a system environment for creating configurational blocks used for building continuous real-time software logical sequences, in accordance with an embodiment of the invention.

FIG. 1 provides a block diagram illustrating a system environment 100 for creating configurational blocks used for building continuous real-time software logical sequences, in accordance with an embodiment of the invention. As illustrated in FIG. 1, the environment 100 includes a logical sequence building system 300, an entity system 200, a computing device system 400, and one or more third party systems 201. One or more users 110 may be included in the system environment 100, where the users 110 interact with the other entities of the system environment 100 via a user interface of the computing device system 400. In some embodiments, the one or more user(s) 110 of the system environment 100 may be employees (e.g., application developers, managers, application testers, or the like) of an entity associated with the entity system 200.

The entity system(s) 200 may be any system owned or otherwise controlled by an entity to support or perform one or more process steps described herein. In some embodiments, the entity is a financial institution. In some embodiments, the entity may be a non-financial institution. In some embodiments, the entity may be any organization that develops and/or utilizes one or more entity resources to perform one or more organizational activities. In some embodiments, the one or more third party systems 201 may be systems that facilitate any external third party applications that the entity may use to support, process, and/or develop the one or more applications.

The logical sequence building system 300 is a system of the present invention for performing one or more process steps described herein. In some embodiments, the logical sequence building system 300 may be an independent system. In some embodiments, the logical sequence building system 300 may be a part of the entity system 200.

The logical sequence building system 300, the entity system 200, the computing device system 400, and the third party systems 201 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the logical sequence building system 300 is configured to communicate information or instructions with the entity system 200, and/or the computing device system 400 across the network 150.

The computing device system 400 may be a system owned or controlled by the entity of the entity system 200 and/or the user 110. As such, the computing device system 400 may be a computing device of the user 110. In general, the computing device system 400 communicates with the user 110 via a user interface of the computing device system 400, and in turn is configured to communicate information or instructions with the logical sequence building system 300, and/or entity system 200 across the network 150.

Figure 2:
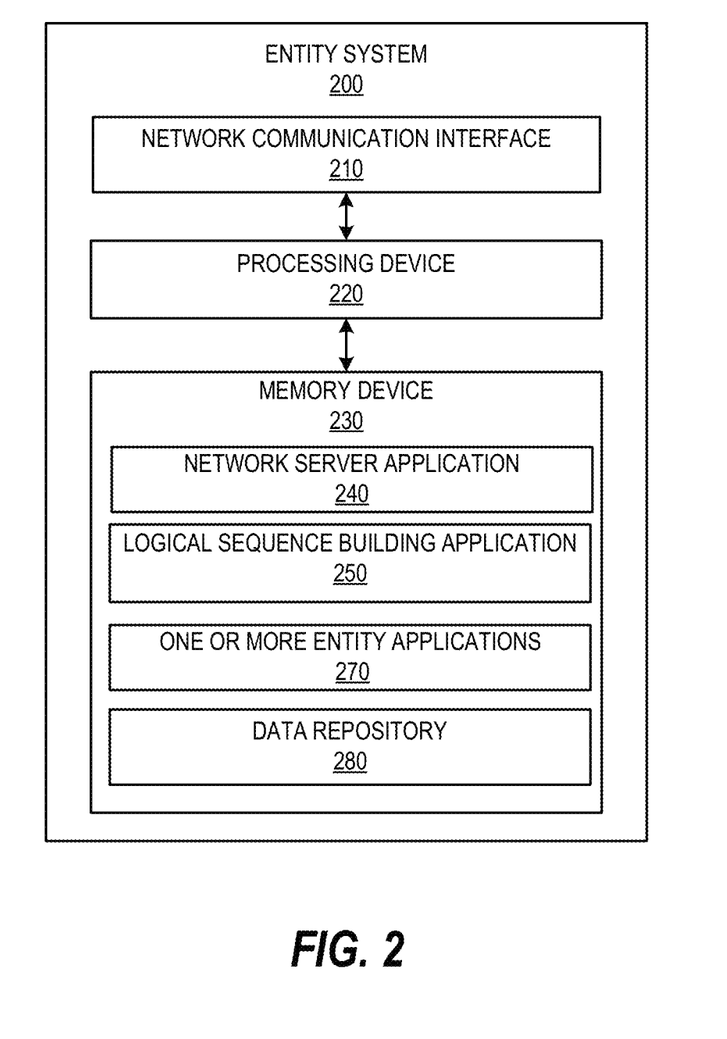
FIG. 2 provides a block diagram illustrating the entity system 200 of FIG. 1, in accordance with an embodiment of the invention.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by a first entity, such as a financial institution or a non-financial institution.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, a logical sequence building application 250, one or more entity applications 270, and a data repository 280 comprising historical activity data associated with the entity and data accessed, retrieved, and/or computed by the entity system 200. The one or more entity applications 270 may be any applications developed, supported, maintained, utilized, and/or controlled by the entity. The computer-executable program code of the network server application 240, the logical sequence building application 250, the one or more entity application 270 to perform certain logic, data-extraction, and data-storing functions of the entity system 200 described herein, as well as communication functions of the entity system 200.

The network server application 240, the logical sequence building application 250, and the one or more entity applications 270 are configured to store data in the data repository 280 or to use the data stored in the data repository 280 when communicating through the network communication interface 210 with the logical sequence building system 300, and/or the computing device system 400 to perform one or more process steps described herein. In some embodiments, the entity system 200 may receive instructions from the logical sequence building system 300 via the logical sequence building application 250 to perform certain operations. The logical sequence building application 250 may be provided by the logical sequence building system 300. The one or more entity applications 270 may be any of the applications used, created, modified, facilitated, developed, and/or managed by the entity system 200.

Figure 3:
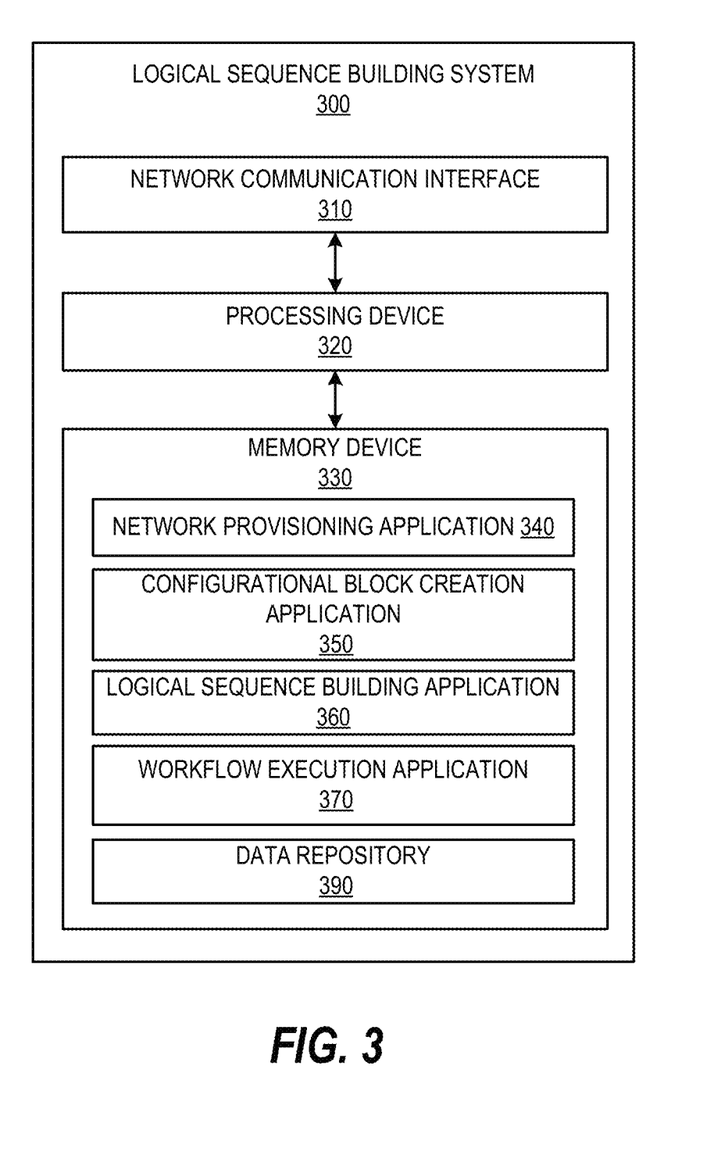
FIG. 3 provides a block diagram illustrating a logical sequence building system 300 of FIG. 1, in accordance with an embodiment of the invention.

FIG. 3 provides a block diagram illustrating the logical sequence building system 300 in greater detail, in accordance with embodiments of the invention. As illustrated in FIG. 3, in one embodiment of the invention, the logical sequence building system 300 includes one or more processing devices 320 operatively coupled to a network communication interface 310 and a memory device 330. In certain embodiments, the logical sequence building system 300 is operated by an entity, such as a financial institution. In other embodiments, the logical sequence building system 300 is operated by a non-financial institution. In some embodiments, the logical sequence building system 300 is owned or operated by the entity of the entity system 200. In some embodiments, the logical sequence building system 300 may be an independent system. In alternate embodiments, the logical sequence building system 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the logical sequence building system 300 described herein. For example, in one embodiment of the logical sequence building system 300, the memory device 330 includes, but is not limited to, a network provisioning application 340, a configurational block creation application 350, a logical sequence building application 360, a workflow execution application 370, and a data repository 390 comprising any data processed or accessed by one or more applications in the memory device 330. The computer-executable program code of the network provisioning application 340, the configurational block creation application 350, the logical sequence building application 360, and the workflow execution application 370 may instruct the processing device 320 to perform certain logic, data-processing, and data-storing functions of the logical sequence building system 300 described herein, as well as communication functions of the logical sequence building system 300.

The network provisioning application 340, the configurational block creation application 350, the logical sequence building application 360, and the workflow execution application 370 are configured to invoke or use the data in the data repository 390 when communicating through the network communication interface 310 with the entity system 200, and/or the computing device system 400. In some embodiments, the network provisioning application 340, the configurational block creation application 350, the logical sequence building application 360, and the workflow execution application 370 may store the data extracted or received from the entity system 200, and the computing device system 400 in the data repository 390. In some embodiments, the network provisioning application 340, the configurational block creation application 350, the logical sequence building application 360, and the workflow execution application 370 may be a part of a single application.

Figure 4:
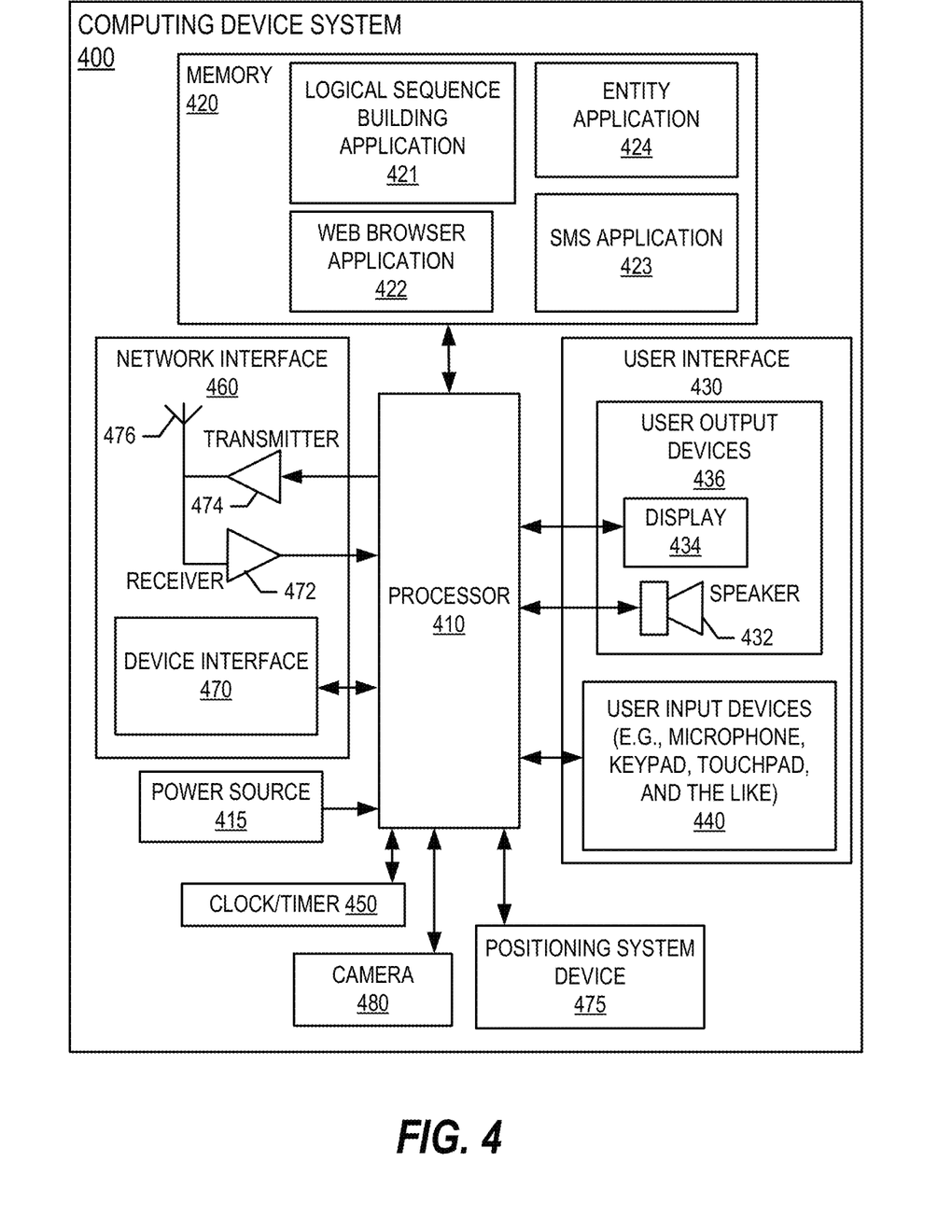
FIG. 4 provides a block diagram illustrating the computing device system 400 of FIG. 1, in accordance with an embodiment of the invention.

FIG. 4 provides a block diagram illustrating a computing device system 400 of FIG. 1 in more detail, in accordance with embodiments of the invention. However, it should be understood that a mobile telephone is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, a logical sequence building application 421, entity application 424. These applications also typically instructions to a graphical user interface (GUI) on the display 430 that allows the user 110 to interact with the entity system 200, the logical sequence building system 300, and/or other devices or systems. The memory 420 of the computing device system 400 may comprise a Short Message Service (SMS) application 423 configured to send, receive, and store data, information, communications, alerts, and the like via the wireless telephone network 152. In some embodiments, the logical sequence building application 421 provided by the logical sequence building system 300 allows the user 110 to access the logical sequence building system 300. In some embodiments, the entity application 424 provided by the entity system 200 and the logical sequence building application 421 allow the user 110 to access the functionalities provided by the logical sequence building system 300 and the entity system 200.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

Figure 5:
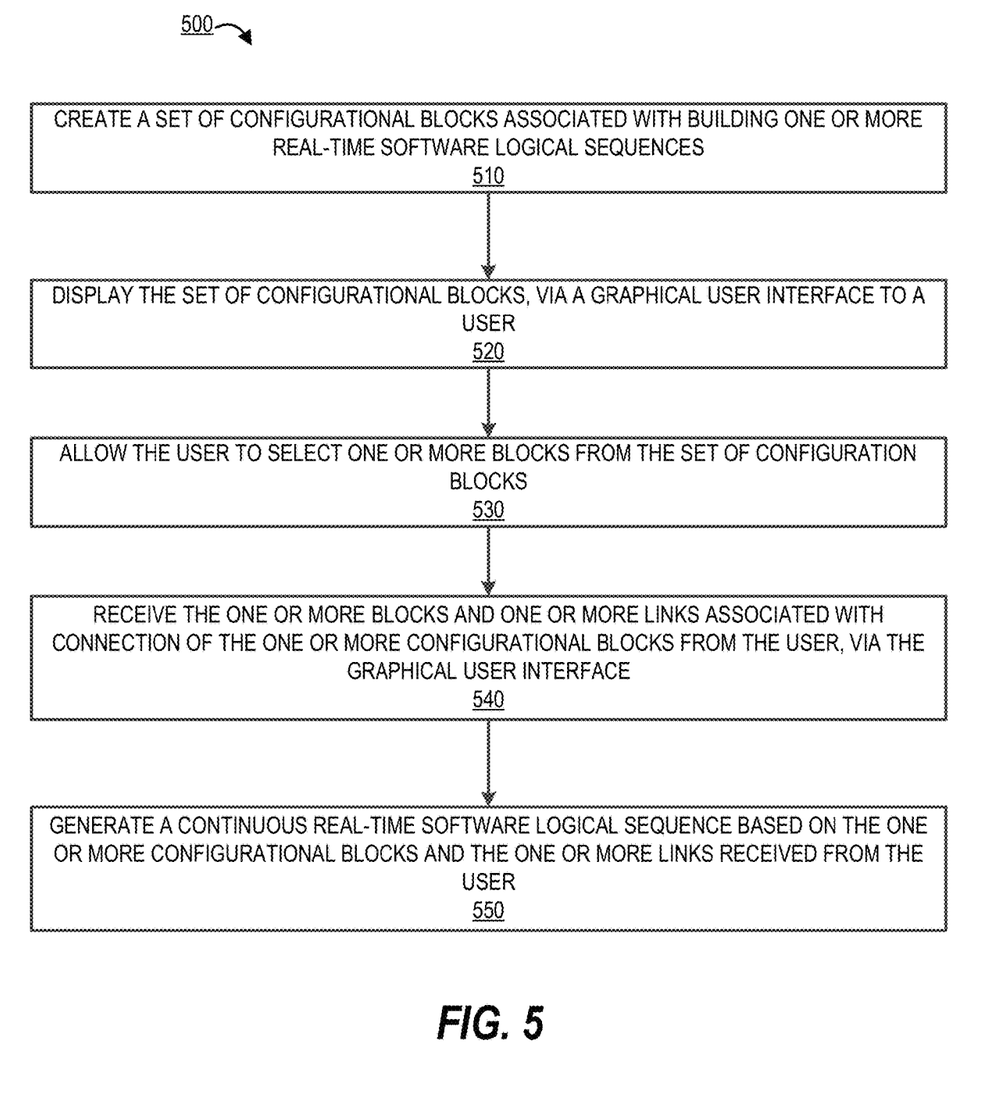
FIG. 5 provides a process flow for creating configurational blocks used for building continuous real-time software logical sequences, in accordance with an embodiment of the invention.

FIG. 5 provides a process flow for creating configurational blocks used for building continuous real-time software logical sequences, in accordance with an embodiment of the invention. As shown in block 510, the system creates a set of configurational blocks associated with building one or more real-time software logical sequences. The set of configurational blocks may be blocks that are configured to implement one or more specific set of actions, where the set of configurational blocks when combined in a logical sequence implement one or more functions of one or more applications that being developed and/or maintained by an entity. Each of the set of configurational blocks is configured to implement a specific action(s). The set of configurational blocks may include, but are not limited to, a fetch (API call) configurational block, a parser configurational block, a recursive execution configurational block, a conditional configurational block, a validation configuration block, a modify configurational block, a submit configurational block, and/or the like. In some embodiments, the set of configurational blocks are M/XEDL configurational blocks that are developed in a Non-Programming Language (NPL). An example of such Non-Programming Language is Markup/XML Execution Definition Language (M/XEDL). In some embodiments, the set of configurational blocks comprise one or more property meta-tags, where the one or more property meta-tags define and support the set of configurational blocks.

In some embodiments, the system may create the set of configurational blocks based on input provided by one or more users. In some embodiments, the system may create the set of configurational blocks based on existing code in one or more entity applications, where creation of the set of configurational blocks comprises crawling and scanning one or more codes associated with one or more entity applications.

As shown in block 520, the system displays the set of configurational blocks, via a graphical user interface to a user. The graphical user interface may be any interface provided by the system of the present invention to display the set of configurational blocks to one or more users of the entity. The one or more users may be employees (e.g., application developer, tester, administrator, or the like) of the entity.

As shown in block 530, the system allows the user to select one or more configurational blocks from the set of configuration blocks. In some embodiments, the system may use the one or more users to select the configurational blocks that when combined in a logical sequence, function as a desired workflow.

Figure 6:
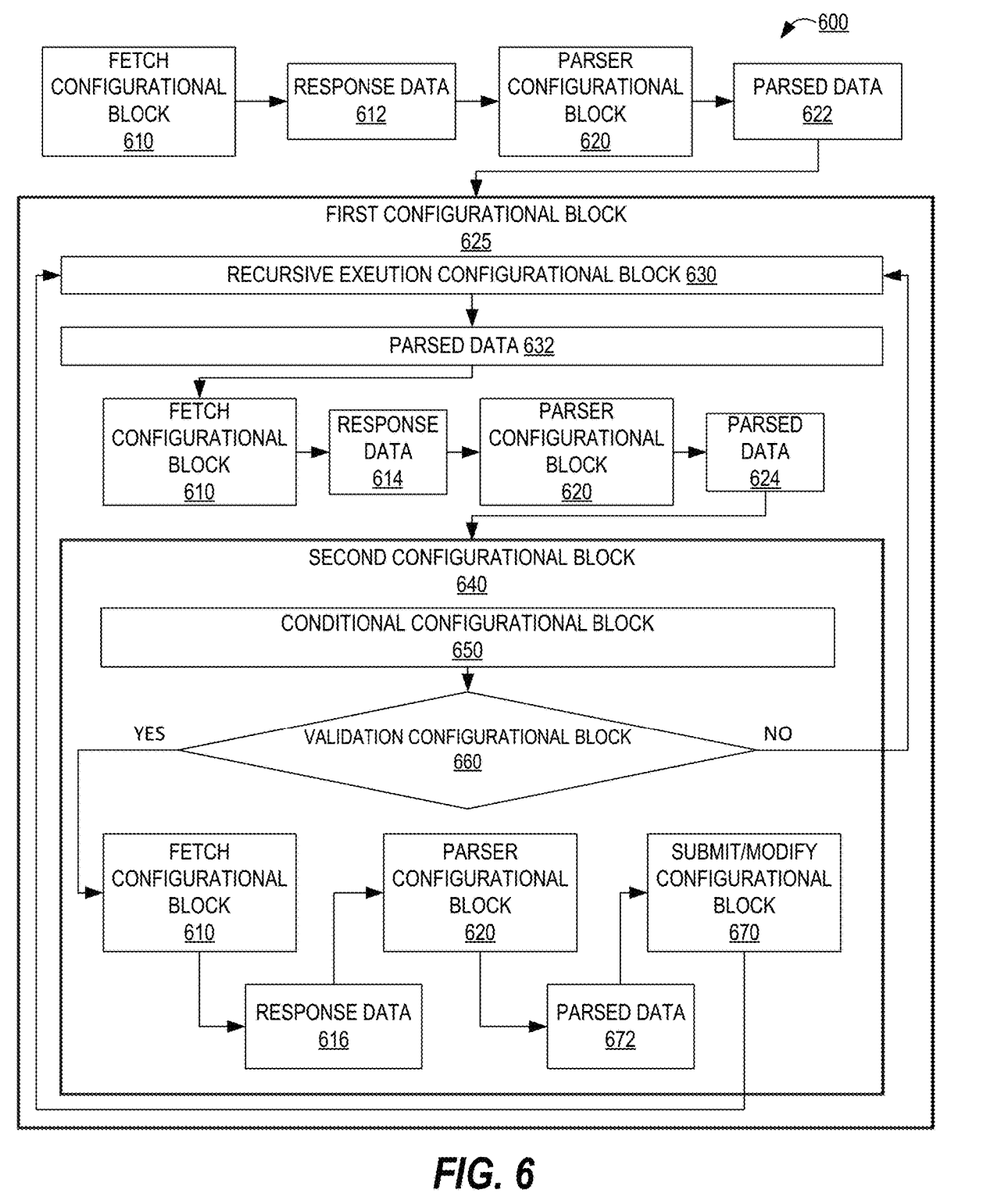
FIG. 6 provides an example of a continuous real-time software logical sequence created using one or more configurational blocks created by the system, in accordance with an embodiment of the invention.

As shown in block 540, the system receives the one or more configurational blocks and one or more links associated with connection of the one or more configurational blocks from the user, via the graphical user interface. In some embodiments, the one or more users select the one or more configurational blocks by using a 'name' or 'type' assigned to a block. In some embodiments, the set of configurational blocks may be displayed in the form of icons, where the one or more users may select, drag, and drop an icon associated with a configurational block, via the graphical user interface provided by the system of the present invention. In such embodiments, the system may allow the user to directly create operational links to connect the selected one or more configurational blocks to create a logical sequence. In some embodiments, the one or more configurational blocks may be nested configurational blocks. In some embodiments, the system may allow the user to build custom nested configurational blocks using the set of configurational blocks. An example of the custom nested configurational block is illustrated in FIG. 6. In some embodiments, the system may allow the users to build modules comprising the set of configurational blocks, where each module implements a combined group of actions.

As shown in block 550, the system generates a continuous real-time software logical sequence based on the one or more configurational blocks and the one or more links received from the user. In response to generating the continuous real-time software logical sequence, the system executes the continuous real-time software logical sequence. The system, in response to executing the continuous real-time software logical sequence, creates one or more runtime variables associated with the continuous real-time software logical sequence and assigns the one or more runtime variables to the one or more property meta-tags.

FIG. 6 provides an example of a continuous real-time software logical sequence created using one or more configurational blocks created by the system, in accordance with an embodiment of the invention. It should be understood that the example described herein is for illustrative purposes only and in way does not delineate the scope of the invention. As shown, the continuous real-time software logical sequence 600 comprises one or more configurational blocks such as a fetch configurational block 610, a parser configurational 620, a recursive execution configurational block 630, a conditional configurational block 650, and a submit/modify configurational block 670. The one or more configurational blocks also comprise custom nested configurational blocks such as a first configurational block 625 and a second configurational block 640 that are built using the configurational blocks above, where the first configurational block 625 and the second configurational block 640 are nested configurational blocks. The fetch configurational block 610 performs one or more Application Programming Interface (API) calls to get response data 612, where the API calls may be Representational State Transfer Application Programming Interface calls. The response data 612 is passed to the parser configurational block 620 which parses the response data 612 and outputs parsed data 622. The parsed data 622 is passed onto the recursive execution configurational block 630 of the first configurational block 625 that generates the parsed data 632. The parsed data 632 is passed onto the fetch configurational block 610 which performs an API call to get the response data 614. The parser configurational block 620 parses the response data 614 to output parsed data 624, where the parsed data 624 is passed onto the conditional configurational block 650 of the second configurational block 640. The conditional configurational block 650 checks if the parsed data 624 is valid or not. If not valid, the process goes back to the recursive execution configurational block 630 and the fetch and parsing process is repeated again. If valid, the parsed data 624 is provided to the fetch configurational block 610, which outputs a response data 616 to the parser configurational block 620 to generate parsed data 626. The parsed data 626 is finally provided to the submit/modify configurational block 670 which submits the data to another workflow or application and the process proceeds back to the recursive execution configurational block 630 which is repeated 'n' times. As such, the system allows users to build complex workflows dynamically in real-time.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for creating configurational blocks used for building continuous real-time software logical sequences, the system comprising:
   at least one network communication interface;
   at least one non-transitory storage device; and
   at least one processing device coupled to the at least one non-transitory storage device and the at least one network communication interface, wherein the at least one processing device is configured to:
      crawl into one or more entity applications and scan software code associated with the one or more entity applications;
      create a set of configurational blocks associated with building one or more real-time software logical sequences in a non-programming language based on one or more pieces of the software code associated with the one or more entity applications, wherein the set of configurational blocks comprise at least a fetch configurational block, a parser configurational block, a recursive configurational block, a conditional configurational block, a validation configurational block, a modify configurational block, and a submit configurational block;
      display the set of configurational blocks, via a graphical user interface to a user;
      allow the user to select a plurality of configurational blocks from the set of configuration blocks;
      receive the plurality of configurational blocks and one or more operational links associated with connection of the plurality of configurational blocks from the user, via the graphical user interface; and
      generate a Representational State Transfer Application Programming Interface call based on the plurality of configurational blocks and the one or more operational links received from the user.

2. The system of claim 1, wherein the at least one processing device is configured to execute the Representational State Transfer Application Programming Interface call in response to generating the Representational State Transfer Application Programming Interface call.

3. The system of claim 2, wherein the plurality of configurational blocks comprise one or more property meta-tags.

4. The system of claim 3, wherein the at least one processing device is configured to:
   in response to executing the continuous real-time software logical sequence, create one or more runtime variables associated with the continuous real-time software logical sequence; and
   assign the one or more runtime variables to the one or more property meta-tags.

5. The system of claim 1, wherein the at least one processing device is configured to create the set of configurational blocks based on one or more inputs from one or more users.

6. The system of claim 1, wherein the plurality of configurational blocks are nested configurational blocks.

7. A computer program product for creating configurational blocks used for building continuous real-time software logical sequences, the computer program product comprising a non-transitory computer-readable storage medium having computer executable instructions for causing a computer processor to perform the steps of:

crawling into one or more entity applications and scanning software code associated with the one or more entity applications;
creating a set of configurational blocks associated with building one or more real-time software logical sequences in a non-programming language based on one or more pieces of the software code associated with the one or more entity applications, wherein the set of configurational blocks comprise at least a fetch configurational block, a parser configurational block, a recursive configurational block, a conditional configurational block, a validation configurational block, a modify configurational block, and a submit configurational block;
displaying the set of configurational blocks, via a graphical user interface to a user;
allowing the user to select a plurality of configurational blocks from the set of configuration blocks;
receiving the plurality of configurational blocks and one or more operational links associated with connection of the plurality of configurational blocks from the user, via the graphical user interface; and
generating a Representational State Transfer Application Programming Interface call based on the plurality of configurational blocks and the one or more operational links received from the user.

8. The computer program product of claim 7, wherein the computer executable instructions cause the computer processor to perform the step of executing the Representational State Transfer Application Programming Interface call in response to generating the Representational State Transfer Application Programming Interface call.

9. The computer program product of claim 8, wherein the plurality of configurational blocks comprise one or more property meta-tags.

10. The computer program product of claim 9, wherein the computer executable instructions cause the computer processor to perform the steps of:
in response to executing the continuous real-time software logical sequence, creating one or more runtime variables associated with the continuous real-time software logical sequence; and
assigning the one or more runtime variables to the one or more property meta-tags.

11. The computer program product of claim 7, wherein computer executable instructions cause the computer processor to perform the step of creating the set of configurational blocks based on one or more inputs from one or more users.

12. The computer program product of claim 7, wherein the one or more configurational blocks are nested configurational blocks.

13. A computer implemented method for creating configurational blocks used for building continuous real-time software logical sequences, wherein the method comprises:
crawling into one or more entity applications and scanning software code associated with the one or more entity applications;
creating a set of configurational blocks associated with building one or more real-time software logical sequences in a non-programming language based on one or more pieces of the software code associated with the one or more entity applications, wherein the set of configurational blocks comprise at least a fetch configurational block, a parser configurational block, a recursive configurational block, a conditional configurational block, a validation configurational block, a modify configurational block, and a submit configurational block;
displaying the set of configurational blocks, via a graphical user interface to a user;
allowing the user to select a plurality of configurational blocks from the set of configuration blocks;
receiving the plurality of configurational blocks and one or more links associated with connection of the plurality of configurational blocks from the user, via the graphical user interface; and
generating a Representational State Transfer Application Programming Interface call based on the plurality of configurational blocks and the one or more links received from the user.

14. The computer implemented method of claim 13, wherein the method comprises executing the Representational State Transfer Application Programming Interface call in response to generating the Representational State Transfer Application Programming Interface call.

15. The computer implemented method of claim 14, wherein the plurality of configurational blocks comprise one or more property meta-tags.

16. The computer implemented method of claim 15, wherein the method further comprises:
in response to executing the continuous real-time software logical sequence, creating one or more runtime variables associated with the continuous real-time software logical sequence; and
assigning the one or more runtime variables to the one or more property meta-tags.

17. The computer implemented method of claim 13, wherein the method further comprises creating the set of configurational blocks based on one or more inputs from one or more users.

18. The computer implemented method of claim 13, wherein the plurality of configurational blocks are nested configurational blocks.

* * * * *